(12) United States Patent
Fairbanks et al.

(10) Patent No.: US 7,978,926 B2
(45) Date of Patent: *Jul. 12, 2011

(54) EDGE RINGING ARTIFACT SUPPRESSION METHODS AND APPARATUSES

(75) Inventors: Ronald Ray Fairbanks, Haymarket, VA (US); Herbert Carl Stankwitz, Clifton, VA (US); Stephen Paul Taylor, Ann Arbor, MI (US)

(73) Assignee: Integrity Applications Incorporated, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,748

(22) Filed: Jan. 24, 2011

(65) Prior Publication Data

US 2011/0116728 A1    May 19, 2011

Related U.S. Application Data (63) Continuation of application No. 11/652,370, filed on Jan. 11, 2007, now Pat. No. 7,876,973.

(60) Provisional application No. 60/758,221, filed on Jan. 12, 2006.

(51) Int. Cl.
    *G06K 9/40*    (2006.01)
    *H04N 1/38*    (2006.01)
(52) U.S. Cl. ......... 382/266; 358/463; 382/260; 382/275
(58) Field of Classification Search .................. 382/128, 382/263–264, 266–269, 274–275, 284, 305, 382/312; 345/7, 611, 647; 358/1.2, 3.26, 358/3.27, 447, 463, 532, 540, 1.9, 2.1; 356/124.5
    See application file for complete search history.

(56) References Cited

U.S. PATENT DOCUMENTS

| | | | |
|---|---|---|---|
| 3,859,460 A * | 1/1975 | Westell | 348/169 |
| 3,977,795 A | 8/1976 | Buschmann | |
| 5,349,359 A | 9/1994 | Dallaire et al. | |
| 5,686,922 A | 11/1997 | Stankwitz et al. | |
| 5,854,602 A | 12/1998 | Stankwitz et al. | |
| 5,912,744 A | 6/1999 | Nakane | |
| 6,419,361 B2 * | 7/2002 | Cabib et al. | 351/221 |
| 7,002,533 B2 | 2/2006 | Sayag | |
| 7,050,200 B2 | 5/2006 | Sanger | |
| 7,320,517 B2 * | 1/2008 | Dai et al. | 351/205 |

OTHER PUBLICATIONS

Lakhani, Gopal, "Improved equations for JPEG's blocking artifacts reduction approach", IEEE Transactions on Circuits and Systems for Video Technology, vol. 7, No. 6, pp. 930-934, (Dec. 1997).

(Continued)

*Primary Examiner* — Kanji Patel
(74) *Attorney, Agent, or Firm* — Knobbe Martens Olson & Bear LLP (57) ABSTRACT

In some embodiments, the present invention relates to methods or suppressing edge ringing in images. For example, in some embodiments a method of processing an image to suppress ringing and broadened edges induced by image correction processing, includes high-pass filtering a first image to obtain a second image, processing said second image including applying non-linear apodization to said second image to obtain a third image, low-pass filtering said first image to obtain a fourth image, and combining the third image and the fourth image to obtain an output image, wherein the output image is characterized by having reduced edge-response sidelobes as compared to the first images. In some embodiments, the present invention relates to devices comprising means and/or modules to suppress edge ringing in images.

20 Claims, 7 Drawing Sheets

OTHER PUBLICATIONS

Marziliano, P., et al., "Perceptual blur and ringing metrics: application to JPEG2000", Signal Processing: *Image Communications*, vol. 19, pp. 163-172, (2004).

Oguz, S.H., et al., "Image coding ringing artifact reduction using morphological post-filtering", IEEE Second Workshop on Multimedia Signal Processing, pp. 628-633, (Dec. 1998).

Stankwitz, H.C., et al., Nonlinear apodization for sidelope control in SAR imagery, IEEE Transactions on Aerospace and Electronics Systems, vol. 31, No. 1, pp. 267-279, (Jan. 1, 1995).

Stankwitz, et al., "Edge ringing artifact suppression for enhanced resolution," IEEE International Symposium on Biomedical Imaging (Apr. 2007).

\* cited by examiner

EDGE RINGING ARTIFACT SUPPRESSION METHODS AND APPARATUSES

CROSS-REFERENCE TO RELATED APPLICATIONS

This application is a continuation of U.S. application Ser. No. 11/652,370, filed Jan. 11, 2007, now U.S. Pat. No. 7,876,973, which claims the benefit of U.S. Provisional No. 60/758,221, filed on Jan. 12, 2006, which are both hereby incorporated by reference in their entireties.

BACKGROUND OF THE INVENTION

1. Field of the Invention

In some embodiments, the present invention relates to systems and methods of enhancing resolution of an image. In particular, the present invention relates to suppressing edge ringing artifacts in images.

2. Description of the Related Art

In optics, the modulation transfer function (MTF) characterizes the ability of an optical device to transfer contrast of an image. In a variety of applications, images are collected by image sensors where the specific optics and electronics of image sensors affect the quality of the image. Specifically, high-contrast edges within the actual image are frequently degraded by the sensor. Attenuated edges may result from the reconstruction of a transformed image or the image may simply be defocused.

The images output by an image sensor can be processed by correction algorithms, such as a modulation transfer function correction algorithm or a modulation transfer function compensation algorithm (MTFCs). These techniques amplify the higher spatial frequencies of the image, thereby sharpening edges of an object depicted in the image. Several examples of MTFCs include various Wiener filters, Generalized Inverse Filters (GIFs), Poisson maximum a posteriori non-linear processing, and regularized inverse filters.

Although MTFCs can be used to sharpen images, application of the MTFC frequently results in large edge ringing effects, thereby also degrading image quality. For example, text includes many sharp edges and is a prime candidate for ringing artifacts. Edge ringing produced by MTFC can be particularly pronounced for sparse apertures, multispectral collection systems, and aberrated optical trains. Images collected with sparse apertures are particularly susceptible to aberrations due to tip, tilt, and piston errors, thereby causing ringing effects. Ringing noise in video is visible as local flickering near edges.

Digital images are commonly post-processed to mitigate the effects of artifacts in the reconstructed image. Some post-processing methods attempt to recover the original image from a combination of the decompressed image data and information related to the smoothness properties of the image before compression. In general, post-processing methods are complex, often iterative and time consuming, computationally expensive, and can degrade the sharpness of the image, thereby limiting the usefulness of the methods.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other image correction processes and apparatuses.

In one embodiment, a method of processing an image to suppress ringing induced by image correction processing includes high-pass filtering a first image to obtain a second image, processing said second image including applying non-linear apodization to said second image to obtain a third image, low-pass filtering said first image to obtain a fourth image, and combining the third image and the fourth image to obtain an output image, wherein the output image is characterized by having reduced edge-response sidelobes as compared to the first image. The application of non-linear apodization can include processing the second image using a processing technique selected from the group of Spatially Variant Apodization (SVA), Adaptive Sidelobe Reduction (ASR), adaptive Kaiser windowing, and dual apodization. In some aspects, the second image includes a set of data samples, and applying non-linear apodization includes determining a weight for each data sample in said set of data samples, and calculating a new value for each data sample in said set of data samples based on the determined weight of one or more neighboring data samples. The application of non-linear apodization may reduce edge ringing characteristics of said first image. The method may further comprise correction processing an input image to compensate for sensor induced degradation to produce said first image, wherein said correction processing comprises using a Modulation Transfer Function Correction (MTFC) technique. The Modulation Transfer Function Correction (MTFC) technique can, in some embodiments, comprise Fourier transforming said input image, applying a function to the transformed image to form a resulting image, said applied function representative of an inverse Modulation Transfer Function of an imaging system used to collect said input image, and inverse Fourier transforming the resulting image to form said first image. High-pass filtering may comprise using a Hanning high-pass filter. Low-pass filtering may include using a Hanning low-pass filter. In some embodiments, the first image comprises an electro-optical image. In some embodiments, the first image comprises a biomedical image.

In another embodiment, a method of applying non-linear apodization processing to a biased image to suppress edge ringing characteristics includes unbiasing at least a portion of the biased image to obtain an unbiased image, applying a non-linear apodization technique to the unbiased image to obtain a second image, and reversing the unbiasing to the second image to form an output image. In some embodiments, the non-linear apodization method is Spatially Variant Apodization (SVA). In some aspects the unbiasing includes high-pass filtering. In some aspects reversing the unbiasing includes low-pass filtering. In some aspects, the unbiasing includes unbiasing a pixel based on properties of a local pixel area or neighborhood proximate to the pixel being unbiased, for example, where the local area is greater than or equal to two pixels by two pixels.

In another embodiment, an image processing system includes a first processing module configured to un-bias at least a portion of a biased image to obtain an unbiased image, a second processing module configured to apply non-linear apodization processing to the unbiased image to obtain a second image, a third processing module configured to reverse the unbiasing to the second image to obtain an output image. The system can further include a pre-processing module configured to apply a resolution-enhancing correction to an input image to obtain said first image. The correction may comprise a Modulation Transfer correction. In some embodiments, the system further comprises a sensor module configured to obtain said input image. In some embodiments, the system can further comprise a sensor configured to provide said input image to said sensor module. In some aspects the sensor is configured to obtain biomedical images. The sensor can include an imaging device, or the sensor can collect data and provide the data to an imaging device. The sensor may comprise one or more lenses and at least one aperture. Some such sensors are configured to collect or generate an image of an astronomical scene or of a portion of earth. In some aspects, the sensor includes a camera, a x-ray imaging device, an ultrasound imaging device, or a magnetic resonance imaging system. The non-linear apodization processing may comprise Spatially Variant Apodization. The system may further comprise a display device to display the output image.

In some embodiments, a computer having a memory that can store both an image processing program and an image therein, the image processing program including means to un-bias at least a portion of a biased image to obtain an unbiased image, means to apply non-linear apodization to the unbiased image to obtain a second image, and means to reverse the unbiasing to the second image to obtain an output image. In some aspects the image processing program also includes means to apply Modulation Transfer Function Correction to the first image. The non-linear apodization method may be Spatially Variant Apodization.

In some embodiments, a machine readable medium includes instructions for processing multimedia data that upon execution causes a machine to un-bias a biased image to obtain an unbiased image, apply non-linear apodization to said unbiased image to obtain a second image, and reverse the unbiasing to the second image to obtain an output image.

DETAILED DESCRIPTION OF THE PREFERRED EMBODIMENT

Each of the inventive apparatuses and methods described herein has several aspects, no single one of which is solely responsible for its desirable attributes. Without limiting the scope of this invention, its more prominent features will now be discussed. After considering this discussion, one will understand how the features of this invention provides improvements for image processing apparatuses and methods.

Many images, for example, biomedical images, are obtained via microscopy, Radiology, Magnetic Resonance Imaging (MRI), and acoustic means (e.g., ultrasound) and typically undergo post-processing to remove unwanted and corrupting effects caused by propagation path anomalies, motion-induced smearing (sensor and image-object-induced), optical transfer function aberrations, and imperfections in the focal plan array, to name a few examples. This post-processing may greatly improves the image quality and utility of the final displayed image relative to the originally sampled "raw" image (e.g., the image obtained directly from an imaging sensor system without additional enhancements). However, such post-processing enhancement algorithms and compensation techniques (e.g., Modulation Transfer Function Correction) can induce edge ringing effects and/or amplify high-frequency noise, as the Fourier transform of a limited duration sine wave produces a waveform that can be described by a sinc function. The sinc function has a mainlobe which contains the peak and has a width up to the first zero crossing, and a set of sidelobes comprising the oscillating remainder on both sides of the mainlobe. The presence of sidelobes reduces the ability to discriminate between sinc functions.

Embodiments described herein sharpen edges and reduce ringing caused by MTF correction with minimal high-frequency amplification. In one example of a process for reducing edge ringing, an MTF correction is applied to an image to correct for imaging system induced aberrations. The corrected image is then transformed to a "zero-mean" format (e.g., unbiased), non-linear apodization processing is applied to the transformed image, and then the image is transformed back to back to its original format (e.g., a full-spectrum image) to form an output image having sharp edges and reduced ringing when compared to the MTF-corrected image.

The term "image" as used herein can refer to, for example, an information-carrying signal, a set of data representative of a scene, data generated by a sensor, or data representative of sensor data, which can be at least partially depicted in a two-dimensional representation, for example, on a display device. The image can be generated from a variety of types of image systems, including but not limited to an optical, electro-optical, magnetic resonance imaging, radiation, x-radiation systems, or an acoustical imaging system. For example, the image can be an astronomical image, a biomedical image, or a tomographic image. In some embodiments, the image can be generated using optical and/or electro-optical means, for example through the use of one or more apertures, lenses, prisms, filters, mirrors and/or optical imaging sensors including, but not limited to, a photomultiplier tube, film, or a CCD array or other electro-optical imaging device.

In some embodiments, the images may be obtained from optical imaging systems characterized by a variety of Q factors. In some embodiments, the optical Q of the imaging system is 2.0 or higher, and the highest spatial frequency passed by the system is limited by its MTF. In other embodiments, the optical Q of the imaging system is less than 2.0, and the limit in the resolvable spatial frequency is due to the sampling spacing in the focal plane array; however, the ultimate resolution of the system is still impacted by the MTF due to the aperture.

In some embodiments, an image input into a device for reducing image-correction induced edge artifacts (sometimes referred to herein as the "input image") may be representative of a collection of displayable pixels, wherein each pixel is characterized by one or more numerical values. In some embodiments, input images may be a series of at least partially related images, for example, a video. In such instances each image within the video can either be processed separately, or two or more input images can be processed such that information from processing one or more of the images is used at least in part to process another image, for example, using an algorithm or learning rule to more efficiently process consecutive images within the video making use of the at least somewhat related nature of the series of images.

In a typical synthetic aperture radar (SAR), a series of coherent linear-FM chirped pulses is transmitted and received from a moving vehicle such as an aircraft or satellite. The received pulses are digitized and processed to form raw data that is Fourier transformed to yield a complex image that is detected and displayed. However, transforming a limited duration sine wave produces a waveform that can be described by a sinc function. The sinc function has a mainlobe which contains the peak and has a width up to the first zero crossing, and a set of sidelobes comprising the oscillating remainder on both sides of the mainlobe. The presence of sidelobes reduces the ability to discriminate between sinc functions.

Sidelobes of the impulse response can be reduced by multiplying the signal prior to compression by an amplitude function that is a maximum at the center and tending toward zero at the edges. Sidelobe reduction by amplitude multiplication is called "weighting" or, sometimes, "apodization." Though many kinds of apodization also result in the broadening of the mainlobe which degrades the resolution of the system, techniques, such as Spatially Variant Apodization (SVA) and Super Spatially Variant Apodization, were developed to reduce sidelodes without broadening the mainlobe. Apodization techniques, and in particular SVA and Super SVA, are further described in U.S. Pat. Nos. 5,349,359 and 5,686,922, both of which are incorporated by reference in their entireties.

Non-linear apodization techniques, such as SVA, can be used for removing sidelobes from radar images. However, these techniques have not previously been adapted for non-coherent Electro-Optic/Infrared imagery due, at least in part, to differences in the data. Radar data sets are coherent, are comprised of real (in-phase) and imaginary (quadrature) components, and both of these components appear to randomly oscillate about zero (e.g., the mean of the in-phase components and quadrature components are both near zero.) Meanwhile, most non-radar images are characterized by non-zero means and real values.

Figure 1:
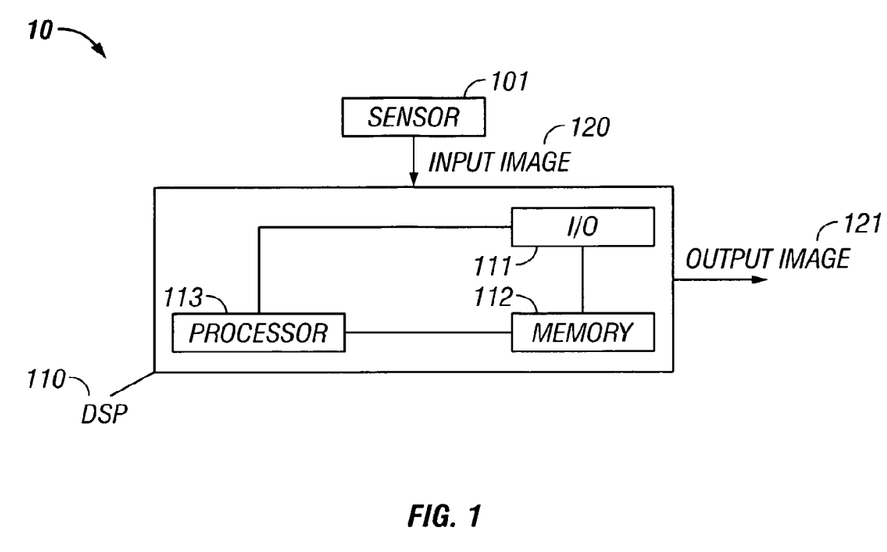
FIG. 1 is a block diagram illustrating a computer system that can be configured to process an image for edge ringing artifact suppression.
Figure 2:
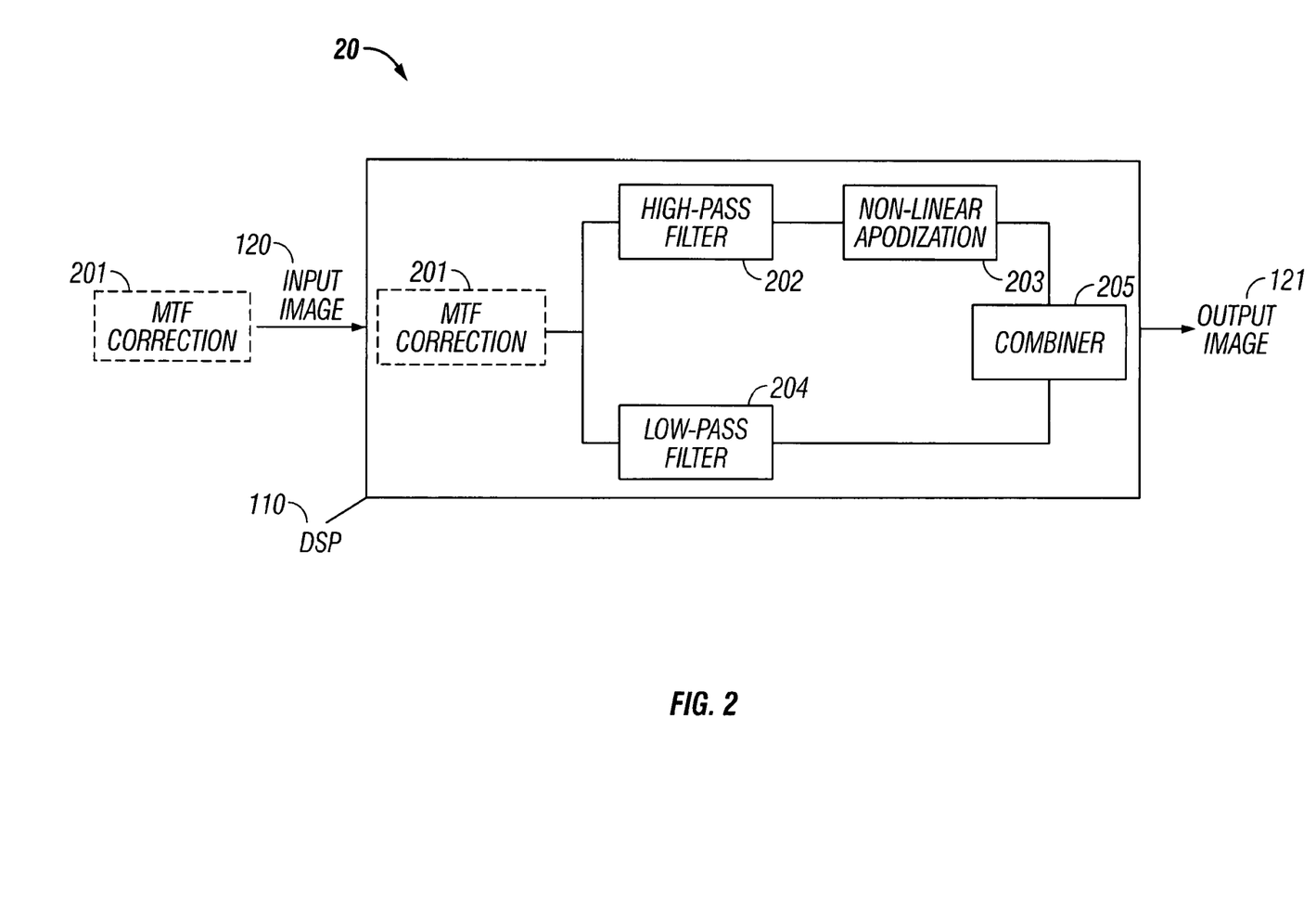
FIG. 2 is another block diagram illustrating processing modules in a computer system that is configured for suppressing edge ringing artifacts.

FIGS. 1 and 2 are block diagrams illustrating examples of systems that are configured to apply a non-linear apodization technique to an image that has edge artifacts. The systems can also first condition an image (e.g., an optical image) to allow application of a non-linear apodization technique, for example, SVA. In particular, some embodiments relate to systems that reduce or suppress sidelobes that have been induced in an image by a Modulation Transfer Function correction which results in edge artifacts that are detrimental to image resolution. Referring first to FIG. 1, system 10 includes a sensor 101 that collects and/or generates an input image 120. The sensor 101 may, for example, an electro-optical, acoustic, magnetic resonance imaging, radiation, or x-radiation sensor or imaging device employed in a variety of applications, including but not limited to biomedical, astronomical, or mapping. In some embodiments, the sensor 101 collects an input image 120 using one or more lenses, prisms, optical filters, mirrors and/or optical imaging sensors such as a photomultiplier tube, film, a digital camera, a digital video camera, or a CCD array or other electro-optical imaging array or device. In some embodiments, the sensor 101 is part of an imaging system which generates an image from collected data, whereas in other embodiments the sensor 101 collects data and supplies it to an imaging system. In some embodiments, the input image 120 can be a previously collected or generated image which is loaded by a user for image processing.

The system 10 can also include a computer, for example a digital signal processing (DSP) component 110, which can comprise an I/O component 111, a memory component 112, and a processor component 113, all in communication. An input image 120 received by the DSP component 110 may be stored in the memory component 112. The memory component 112 can comprise RAM memory, flash memory, ROM memory, EPROM memory, EEPROM memory, registers, a hard disk, a removable disk, a removable memory card, a CD-ROM, or any other form of storage medium known in the art. The memory component 112 is coupled to the processor 113, such that the processor 113 reads information from, and writes information to, the memory component 112. The memory component 112 may be integral to the processor 113. In some embodiments, the processor 113 and the memory component 112 may reside in an ASIC.

The DSP component 110 and the various modules contained therein and components or steps thereof, can be implemented by hardware, software, firmware, middleware, microcode, or any combination thereof. For example, a DSP component 110 may be a standalone component, incorporated as hardware, firmware, middleware in a component of another computer, or be implemented in microcode or software that is executed on the processor, or a combination thereof. When implemented in software, firmware, middleware or microcode, the program code or code segments that perform the processing tasks may be stored in a machine readable medium, for example, a memory component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. In some embodiments, the DSP functionality is implemented on a computer that is in communication with a computer network (e.g., a LAN or WAN, including the Internet) that can provide an input image 120 collected from a remote sensor.

The DSP component 110 processes the input image 120 to reduce edge ringing present in the input image 120 and generates an output image 121. In some embodiments, the device has a means for displaying the output image 121 (e.g., a CRT or LCD display). In some embodiments the output image 121 is stored in a memory component so it can be displayed and viewed at a later time, for example, in conjunction with other related images.

FIG. 2 illustrates a block diagram representative of a system 20 that comprises a DSP component 110 configured with modules or components (collectively referred to here as "modules") to process an input image 120 for suppression of edge artifacts, according to some embodiments. The DSP component 110 can include various hardware or software modules, each module implemented in hardware, software, firmware, or a combination thereof. The modules may reside a memory component of the DSP component, for example, in RAM memory, flash memory, ROM memory, EPROM memory, EEPROM memory, registers, a hard disk, a removable disk, a removable memory card, and/or CD-ROM incorporated in the DSP component 110 or in another memory component in communication with the DSP component 110. The DSP component 110 can comprise a high-pass filter module 202, a non-linear apodization module 203, a low-pass filter module 204, and a combiner module 205 as illustrated in FIG. 2. The DSP component 110 can comprise components that implement any method described herein. Additional components may be added to the DSP component 110 or a system described herein.

In operation, an input image 120, which was subject to distortion by the MTF of the collecting sensor, is input to the DSP component 110. In some embodiments, the input image 120 has been previously processed by an MTF correction module 201 (represented by the MTF correction module 201 shown in dashed lines located outside of the DSP component 110) before it is input to the DSP component 110, and in such cases the input image 120 (MTFC corrected) is referred to herein as the "first image." In other embodiments, the DSP component 110 includes an MTF correction module 201 (represented by the MTF correction module 201 shown in dashed lines located inside the DSP component 110) that applies an MTFC to the input image 120 based on the type of sensor data, and this corrected image is referred to herein as the first image. Some specific MTF corrections that can be applied in the MTF correction module 201 are described in greater detail hereinbelow. The first image can be processed by the high-pass filter module 202 to obtain a second image, which is processed by the non-linear apodization module 203 to obtain a third image. Examples of non-linear apodization processing that can be applied in the non-linear apodization module 203 are described in greater detail below. The first image is also communicated to the low-pass filter component 204 which processes the first image with low-pass filtering to obtain a fourth image. The third and fourth image are communicated to the combiner component 205 which produces an output image 121 by combining, at least in part, the third and fourth images, the output image 121 being characterized by having reduced edge-response sidelobes as compared to the first image.

Applying Non-Linear Apodization Techniques

Figure 3:
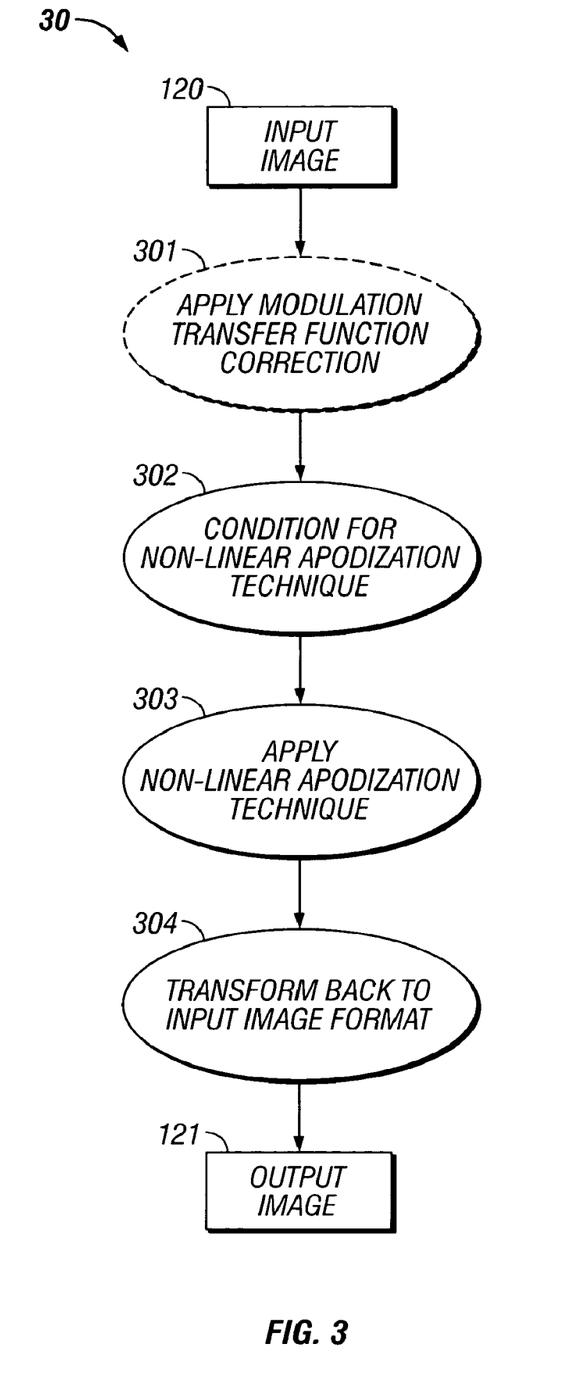
FIG. 3 is a flowchart illustrating an image processing method for suppressing edge ringing artifacts in a non-radar input image.

FIG. 3 illustrates a process 30 which processes an input image 120 distorted by an MTF of a collection sensor or sensor system (e.g., the sensor 101 of FIG. 1) and generates an output image 121 having reduced or suppressed edge ringing artifacts. As indicated above, some embodiments include processing the input image 120 prior to applying a non-linear apodization technique. If the input image 120 has not previously been processed for MTF correction, in state 301 MTFC is applied to the input image 120. This can be done, for example, by the MTF correction module 201 inside the DSP 110 shown in FIG. 1. Modulation Transfer Function Corrections (MTFCs) may be any method used to correct for the attenuation of contrast associated with an MTF. Preferred MTFCs for a particular application can be dependent on the MTF of the sensor used to collect the input image 120.

In some embodiments, application of an MTFC includes performing an Fourier transform on the original image (input image 120), applying a sharpening function or a MTF inverse function to the transformed image (e.g., a MTF function derived from the sensor or imaging system used to collect the input image 120), and then performing another inverse Fourier transform. Such corrections, while resulting in a "sharper" image, also result in edge ringing artifacts. In some embodiments, the MTFC is a Wiener filter, a Generalized Inverse Filter (GIF), a non-linear filter, or a Regularized filter. More specifically, other well-known MTFCs include a Regularized inverse filter, a Wiener Filter estimated from the Imagery, a Wiener Filter with scalar noise and signal Power Spectral Densities, a Generalized Inverse Filter with a maximum level set, a Generalized Inverse Filter with a zero level set, Poisson Maximum A Posteriori (PMAP) non-linear processing, and Lucy-Richardson non-linear processing. In some embodiments, for example, when MTFC has already been applied to the input image 120, the MTFC correction at state 301 is not applied to the input image.

In some embodiments, an input image(s) can be processed by multiple combinations of methods disclosed herein and various MTFCs in order to identify the most appropriate MTFC to combine with the method for a particular application. In other embodiments, a method disclosed herein is combined with a Generalized Inverse Filter with a maximum threshold MTFC. The specific combination of the MTFC and the method disclosed herein can be determined based on the properties associated with an input image, including the specific imaging elements used to collect the input image, for example, a finite aperture or noise in the image.

In state 302, the image is conditioned for the application of a non-linear apodization technique. In preferred embodiments, the conditioning comprises unbiasing the image. The unbiasing can be done, for example, by the high-pass filter module 202 shown in FIG. 2. In some embodiments, the unbiasing comprises converting the image to a zero-mean format. The conditioning of the image may comprise transforming the image to a zero mean format, which may require more than simply removing a DC bias. In some embodiments, the unbiasing comprises subtracting a local average from each pixel. For example, the average of the 3×3 pixel area centered on a given pixel can be calculated and subtracted from the pixel. Conditioning is further described in reference to FIG. 4 below. The conditioning step 302 allows for the application of SAR techniques, such as non-linear apodization techniques, to biased electro-optical images, which was previously prohibited due to the bias of the images.

At state 303, a non-linear apodization technique is applied to the conditioned image to produce a processed image. This can be performed by the non-linear apodization module 203 shown in FIG. 2. In some embodiments, a non-linear apodization technique is selected from the group consisting of Spatially Variant Apodization (SVA), Adaptive Sidelobe Reduction (ASR), adaptive Kaiser windowing, and dual apodization. In some embodiments of the invention, a process that includes a non-linear apodization technique entitled Edge Ringing Artifact Suppression for Enhanced Resolution (ERASER) is combined with a Wiener Filter MTFC. Certain aspects of ERASER processing and some exemplary results are further described in Stankwitz H C, Fairbanks R R, Schwartzkopf W C, and Krauss T G. *Edge Ringing Artifact Suppression for Enhanced Resolution*, IEEE International Symposium on Biomedical Imaging (April 2007), which is incorporated by reference in it entirety.

At state 304, the processed image is then transformed back to full-spectrum image format to produce the output image 121. The image can be transformed by the combiner module 205 shown in FIG. 2. In some embodiments, the processed image can be combined with a low-pass filtered image, generated from a MTFC corrected input image 120, by combining (e.g., adding) the processed image and the low-pass filtered image. For example, the luminance value of corresponding pixels can be added. The images and/or pixels may be scaled either before or after the combining. In embodiments in which the conditioning in state 302 comprises subtracting a local average from each pixel, the transforming back to full-image image may comprise adding the pixel average back to the corresponding pixel of the processed image in state 304.

Figure 4:
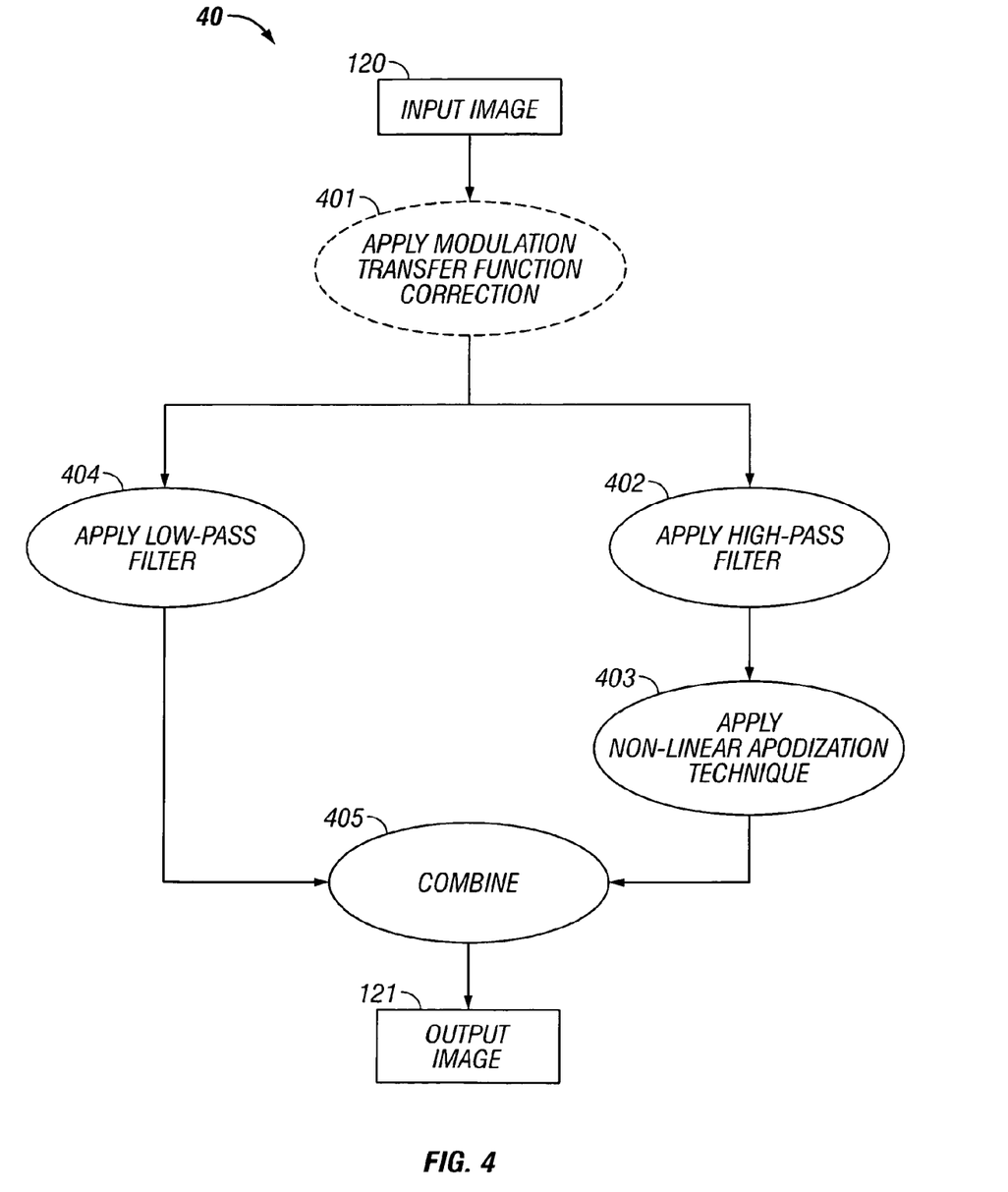
FIG. 4 is another flowchart illustrating an image processing method for suppressing edge ringing artifacts in a non-radar input image.

FIG. 4 further illustrates an example of a process 40 for applying a non-linear apodization technique to an input image 120. At state 401 MTFC is applied to the input image 120 if the image was not previously processed for an MTF correction.

Figure 5:
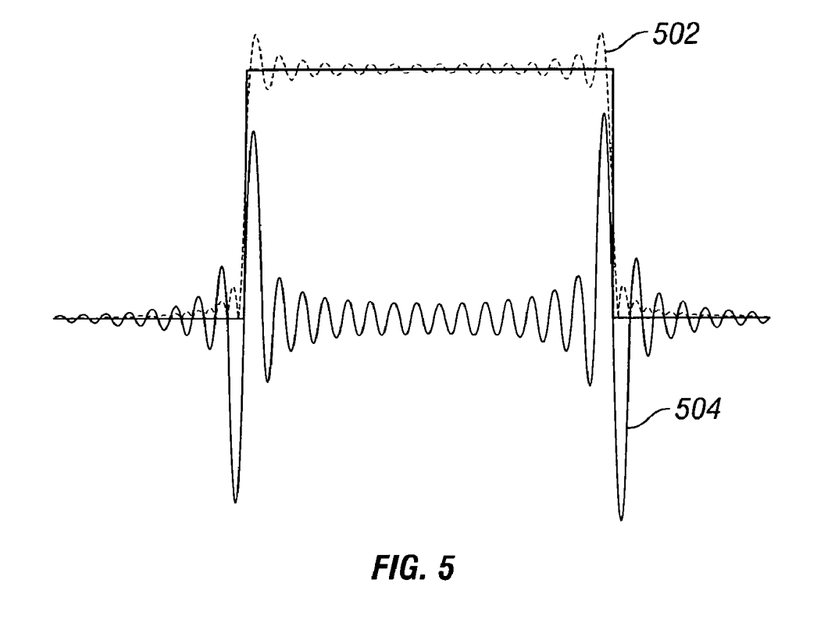
FIG. 5 is a graphical representation illustrating an edge waveform resulting from the removal of bias.

In state 402, the MTF corrected image is unbiased by applying a high-pass filter allowing traditional SVA-like processing to be applied. FIG. 5 graphically illustrates this "bias" removal. Waveform 502 is a portion of a simulated 1-dimensional MTF corrected input image 120 prior to high-pass filtering. Waveform 504 represents the same portion of the input image 120 after high-pass filtering (only the real part of the high-pass filtered waveform 504 is shown in FIG. 5). The high-pass filter effectively removes the "bias" of the initial waveform 502.

Figure 6:
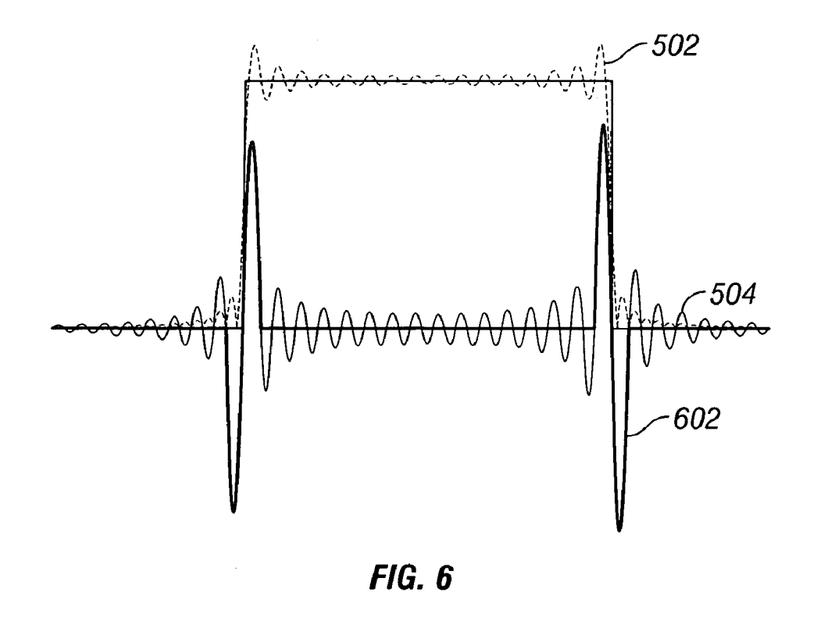
FIG. 6 is a graphical representation illustrating an edge waveform resulting from application of non-linear apodization.

Referring again to FIG. 4, at state 403 a non-linear apodization technique is applied to the high-pass filtered image to produce a processed image. FIG. 6 illustrates the result of the applying a non-linear apodization technique (in this example, SVA) to the high-pass filtered waveform 504, thereby producing a processed waveform 602, which is characterized by suppressed sidelobes resulting from apodization. In state 404 (FIG. 4), the input image 120 is low-pass filtered forming a resulting low-pass filtered image.

Figure 7:
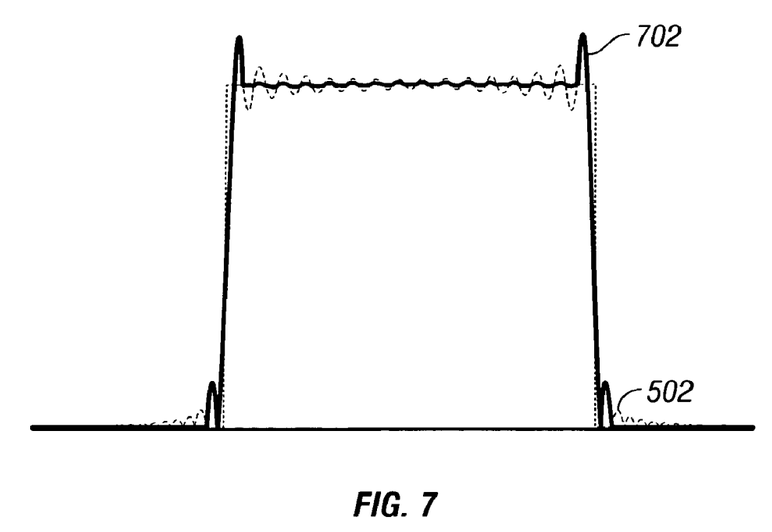
FIG. 7 is a graphical representation illustrating an edge waveform resulting from combining the waveform illustrated in FIG. 6 with a low-pass filtered input image.

At state 405, the processed image resulting from apodization is combined with the low-pass filtered image to produce an output image 121. As shown in FIG. 7, the low-pass filtered image is added to the processed waveform 602 to produce a portion of a waveform 702 of the edge ringing suppressed output image 121. The waveform 702 is characterized by having sharp edges and also suppressed or reduced sidelobes when compared to the same portion of the input image 502.

Figure 8:
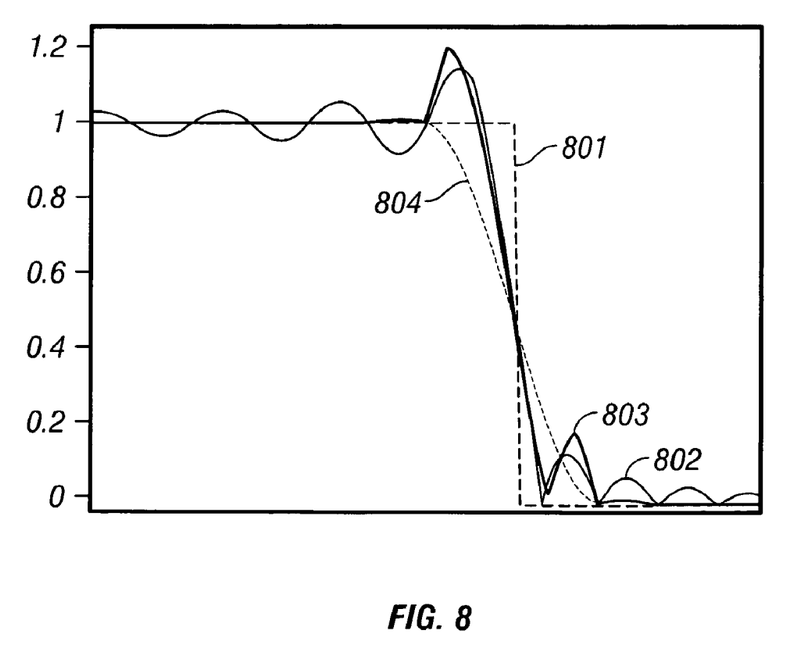
FIG. 8 is a graphical illustration of the performance of the disclosed ERASER method and of the Hanning filter in reducing edge ringing.

FIG. 8 illustrates an example of the sidelobe suppression effect in more detail, showing a comparison of an ideal edge ("square" with no sidelobes) and edges resulting from processing an input image for edge ringing suppression. A 1-dimensional ideal edge 801 was defined as an input image, as shown in FIG. 8. A linear MTF correction was applied to the input image, and the resulting MTF corrected edge 802 is characterized by edge ringing artifacts (e.g., sidelobes). The process 40 illustrated in FIG. 4 was applied to the MTF corrected edge 802. First, a high-pass Hanning filter was applied to the MTF corrected image to obtain a high-pass filtered image (not shown). Next, SVA was applied to the high-pass filtered image to obtain a processed image (not shown). A low-pass Hanning filter was applied to the MTFC image to obtain a low-pass filtered image. The low-pass filtered image was then added to the apodization-processed image to obtain an image depicting the resulting edge 803. The ERASER-generated image suppressed the ringing present in the MTF corrected image while preserving the width of the mainlobe.

To compare these techniques with other commonly-used techniques, a Harming filter was also applied to MTF corrected image. Though the edge 804 resulting from the Hanning-filtered image is characterized by reduced ringing, the edge is also blurred, which can result in a loss in effective resolution.

Both the high- and the low-pass filters can be spatial frequency filters. In some embodiments, state 401 is excluded from the method illustrated in FIG. 4. In some embodiments, the high-pass filter is a Harming high-pass filter and the low-pass filter is a Harming low-pass filter. In other embodiments, one or both of the low-pass filter and the high-pass filter is a "cosine-on-a-pedestal" filter function. In some preferred embodiments, the non-linear apodization technique is SVA.

By high-pass filtering the image, the image can be converted into a zero-mean image. Therefore, the non-linear apodization technique can be applied to the image and the edge ringing caused by a sharpening correction or a MTF correction can be at least partially removed. After the low-pass filtered image is added to the image processed by apodization, the resulting image (e.g., output image 121) retains the low-frequency characteristics of the input image 120 and edge sharpness while suppressing or eliminating the ringing present in the (sharpening or MTF) corrected image.

High- and low-pass filtering can be performed simultaneously or in any order. Similarly, the application of non-linear apodization techniques can be performed before, after, or at substantially the same time as the low-pass filtering. Additionally, methods disclosed herein may further comprise additional steps which may, or may not, be related to reducing sidelobes. In some embodiments, methods disclosed herein can be performed in the spatial domain, while, in other embodiments, methods disclosed herein can be performed in the frequency domain. Some portions of the methods may be performed in the spatial domain while other portions of the same methods may be performed in the frequency domain.

In some embodiments, the processed image resulting from processing in state 403 can be combined with the low-pass filtered image in state 405 by adding the images. For example, the luminance value of corresponding pixels can be added. The images and/or pixels may be scaled either before or after the combining. In some embodiments, methods disclosed herein can be applied to images in real-time, wherein the methods are applied substantially immediately after an image is collected from a device. Alternatively, methods can be applied to images previously acquired.

Systems and methods disclosed herein can suppress sidelobes or edge ringing in an image, which may improve image enhancement, image restoration, and/or image deblurring, in a computationally efficient manner because they can be implemented using relatively few operations per image pixel, thereby improving the computational efficiency of methods using this technique. In some embodiments, the edge ringing is suppressed with respect to the corresponding image after the MTFC correction has been applied. In other embodiments, the edge ringing is suppressed with respect to the input image, wherein MTFC may or may not have been applied to the input image. Preferred embodiments preserve the width of the mainlobe. In other embodiments, the width of the mainlobe remains substantially un-broadened with respect to frequency-domain windowing.

Image quality assessment can occur in order to generally characterize the quality of the output image or to compare the quality of the output image to the quality of the "true" image. As one of skill in the art will appreciate, some of the parameters and/or steps of the embodiments described herein can be optimized using training data and comparing image quality of the "true" image and the output image. Testing and/or training data may be used to determine the specific combination of a method disclosed herein and the MTFC. Similarly, training data may further be used to optimize any other steps (such as the non-linear apodization method or the unbiasing method) disclosed herein. In such situations, "true" images may be converted to input images by applying modulation transfer functions thought to occur due to specific apertures or other imaging characteristics. Methods described herein may then be applied to the input images, and the output images of the methods can be compared to the "true" images. In some embodiments, parameters and/or steps of the methods can be systematically altered to optimize the parameters and/or steps. Alternatively, learning rules may be applied to optimize the parameters and/or steps.

Image quality can be evaluated using any known method. In preferred embodiments, image quality is assessed using the Peak Signal-to-Noise Ratio (PSNR) as a mathematically based metric or using the structural similarity (SSIM), a more recent quality metric that has been shown to correlate well with human perceived visual quality, as a Human Visual System based metric. Visual Information Fidelity can also be used as a Human Visual System based metric. In some embodiments, the National Imagery Interpretation Rating Scale can be used as a metric.

In some embodiments, a ringing-specific metric can be used to determine the effectiveness of a method. A visible ringing measure (VRM) includes the use of processing and morphological filters to define the edge regions with increased probability of ringing. Variances are calculated in these regions and can then be used to estimate the ringing. Further details are provided in Oguz, S. H., et al., "Image coding ringing artifact reduction using morphological post-filtering", *IEEE Second Workshop on Multimedia Signal Processing*, (December 1998), pp. 628-633, which is hereby incorporated by reference in its entirety. Other techniques used to quantify ringing are disclosed in Lakhani, G., "Improved equations for JPEG's blocking artifacts reduction approach", *IEEE Transactions on Circuits and Systems for Video Technology* (December 1997), vol. 7, no. 6: pp. 930-934 and Marziliano, P. et al., "Perceptual blur and ringing metrics: application to JPEG2000", *Signal Processing: Image Communication* (2004), vol. 19: pp. 163-172, which are both hereby incorporated by reference in their entireties.

Methods described herein may be incorporated into an imaging processing system, such as illustrated and described in reference to FIGS. 1 and 2. Such systems may comprise an imaging device (e.g., an optical imaging device) to collect images for subsequent edge ringing artifact suppression processing. In some embodiments, the imaging device is a camera configured to capture "still" shots or video (e.g., a security camera) an astronomical device, a microscope system, or a telescope. In these embodiments, the imaging device either includes one or more modules to perform a method described herein, such as converting to un-bias an image, applying a non-linear apodization technique, and then transforming the image back to full-spectrum image format. In some of these embodiments, the imaging device is disposed on a plane or on a satellite. A sensor module included in an imaging device may be configured to capture an astronomical image. An imaging device comprising a sensor module can also comprise an arrangement of lenses or mirrors or both, such that distant objects are magnified. In other embodiments, the imaging device is a biomedical device and can include a sensor module configured to collect biomedical images. The imaging device may obtain an image by one or more magnets or by collecting x-rays. In these embodiments, the imaging device either includes one or more modules to perform one or more of the processes described herein. In some of these embodiments, the image is obtained via magnetic resonance imaging, radiation technology, or x-ray technology. In some embodiments, methods described herein can be incorporated into medical devices in order to track temporally variant and evolving biomedical events and anomalies. In some embodiments, the device is an ultrasound device.

Example 1

Figure 9:
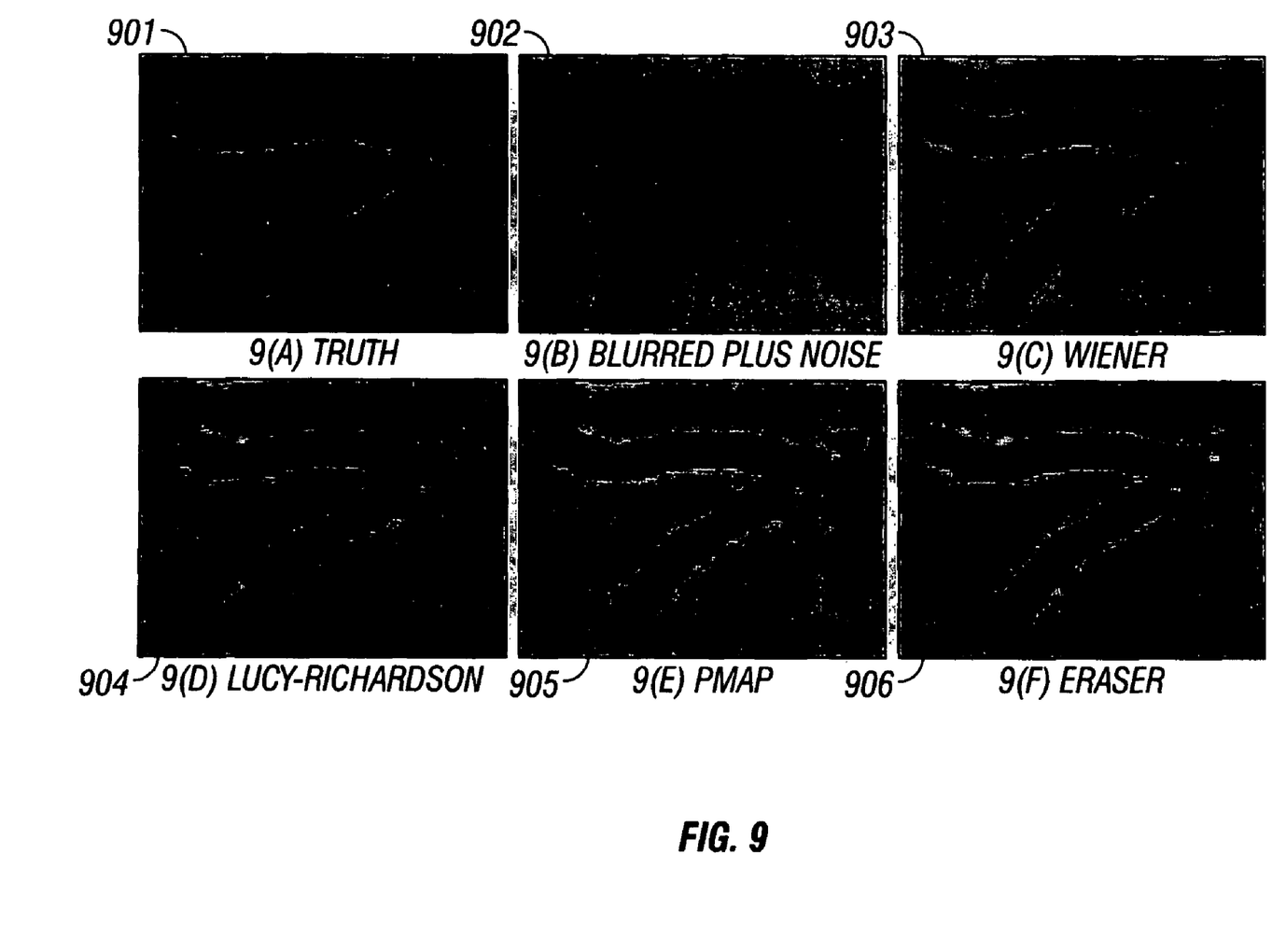
FIG. 9 compares the image obtained from the disclosed ERASER method to the actual image, blurred image with noise, Modulation Transfer Function Corrected (MTFC) image, Lucy-Richardson image, and PMAP image.

A 2-dimensional image was defined as the input image. The example input image 901, as shown in FIG. 9, is a subimage of the larger input image showing a full set of human metaphase chromosomes banded using Giemsa staining. Maximizing effective resolution on these images is particularly important as distinguishing subtleties in the banding patterns is of critical importance in analysis.

The input image was corrupted by a known MTF and additive noise to produce an MTF-corrupted image 902. An MTFC was applied via a Wiener filter to produce the MTFC image 903. Ringing artifacts are apparent in the MTFC image 903.

Lucy-Richardson and Poisson maximum a posteriori (PMAP) methods were applied to the MTFC image to produce the Lucy-Richardson image 904 and the PMAP image 905, respectively. Though the ringing was somewhat reduced, a noticeable halo remained in the image.

Edge Ringing Artifact Suppression for Enhanced Resolution (ERASER) processing was applied to the MTFC image 903. First a high-pass Hanning filter was applied to the MTFC image to obtain a high-pass filtered image (not shown). Next, SVA was applied to the high-pass filtered image to obtain a processed image (not shown). A low-pass Hanning filter was applied to the MTFC image to obtain a low-pass filtered image (not shown), and the low-pass filtered image was then added to the processed image to obtain the ERASER image 906.

Quality metrics were applied to the entire metaphase chromosome image to show an objective measure of quality. For this example, both the ubiquitous PSNR measure and structural similarity (SSIM), a more recent quality metric that has been shown to correlate well with human perceived visual quality, were used. In addition to the ERASER results, Table 1 shows results for the Wiener filter, the Lucy-Richardson algorithm, and PMAP deconvolution.

TABLE 1

|      | Distorted | Wiener | Lucy-Richardson | PMAP  | ERASER |
|------|-----------|--------|-----------------|-------|--------|
| PSNR | 23.44     | 25.06  | 25.06           | 24.75 | 25.68  |
| SSIM | 0.82      | 0.87   | 0.81            | 0.82  | 0.90   |

The metrics that were used essentially weight edge sharpness and mainlobe overshoot much more heavily than ringing artifacts, but ERASER still consistently outperformed all the other restoration methods due to its removal of ringing in the image without sacrificing other aspects of image quality.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of processing an image on a computer system to suppress edge ringing, the method comprising:
   receiving an input image as a first image;
   if the input image has not been previously processed for modulation transfer function (MTF) correction, applying an MTF correction technique to the input image to form a MTF corrected first image;
   conditioning the first image to obtain a second image having a set of data samples;
   applying non-linear apodization to said second image to obtain a third image, wherein applying non-linear apodization comprises
      determining a weight for each data sample in said set of data samples,
      calculating a new value for each data sample in said set of data samples, the new value based on said determined weight of each data sample and on one or more neighboring data samples, and wherein the third image is obtained from the new values of each data sample in said set of data samples;
   low-pass filtering the first image to obtain a fourth image; and
   combining the third image and the fourth image to obtain an output image.

2. The method of claim 1, wherein the output image is characterized by having reduced edge-response sidelobes as compared to the first image.

3. The method of claim 1, wherein applying non-linear apodization comprises processing the second image using a processing technique selected from the group of Spatially Variant Apodization (SVA), Adaptive Sidelobe Reduction (ASR), adaptive Kaiser windowing, and dual apodization.

4. The method of claim 1, wherein applying non-linear apodization comprises Spatially Variant Apodization (SVA).

5. The method of claim 1,
   wherein determining a weight for each data sample comprises determining a weight for each data sample as a function of the negative of a selected data sample divided by the sum of said one or more neighboring data samples of the selected data sample, wherein the weight for each data sample is limited to a predetermined range, and
   wherein calculating a new value for each data sample comprises adding to each data sample the product of the determined weight and the sum of said one or more neighboring data samples.

6. The method of claim 1, wherein said applying an MTF correction technique comprises:
   Fourier transforming the input image;
   applying a function to the transformed image to form a resulting image, said applied function representative of an inverse Modulation Transfer Function of an imaging system used to collect the input image, and
   inverse Fourier transforming the resulting image to form the first image.

7. The method of claim 1, wherein said conditioning the first image comprises unbiasing the first image.

8. The method of claim 1, wherein said conditioning the first image comprises high-pass filtering the first image.

9. The method of claim 8, wherein said high-pass filtering comprises using a Hanning high-pass filter.

10. The method of claim 1, wherein said low-pass filtering comprises using a Hanning low-pass filter.

11. The method of claim 1, wherein the first image comprises an electro-optical image.

12. The method of claim 1, wherein the first image comprises a biomedical image.

13. A method of processing a biased image on a computer system to suppress edge ringing characteristics in an output image, the method comprising:
   conditioning at least a portion of the biased image to obtain an unbiased image having a set of data samples;
   applying non-linear apodization to the unbiased image to obtain a second image, wherein applying non-linear apodization comprises determining a weight for each data sample in said set of data samples, and calculating a new value for each data sample in said set of data samples, the new value based on said determined weight of each data sample and on one or more neighboring data samples; and
   reversing the unbiasing to the second image to form the output image.

14. The method of claim 13, wherein the non-linear apodization method is Spatially Variant Apodization (SVA).

15. The method of claim 13, wherein said conditioning comprises high-pass filtering.

16. The method of claim 13, wherein said conditioning comprises converting the image to a zero-mean format.

17. The method of claim 13, wherein reversing the unbiasing comprises low-pass filtering.

18. The method of claim 13, wherein the unbiasing comprises unbiasing a pixel based on properties of a local area.

19. The method of claim 18, wherein the local area is greater than or equal to two pixels by two pixels.

20. A non-transitory computer readable medium comprising instructions for processing multimedia data that upon execution causes a machine to:
   receive an input image as a first image;
   if the input image has not been previously processed for modulation transfer function (MTF) correction, apply an MTF correction technique to the input image so that the first image is MTF corrected;
   condition the first image to obtain a second image having a set of data samples;
   apply non-linear apodization to said second image to obtain a third image, wherein applying non-linear apodization comprises
      determining a weight for each data sample in said set of data samples,
      calculating a new value for each data sample in said set of data samples, the new value based on said determined weight of each data sample and on one or more neighboring data samples, and wherein the third image is obtained from the new values of each data sample in said set of data samples;
   low-pass filter the first image to obtain a fourth image; and
   combine the third image and the fourth image to obtain an output image.

* * * * *

UNITED STATES PATENT AND TRADEMARK OFFICE
CERTIFICATE OF CORRECTION

| | | |
|---|---|---|
| PATENT NO. | : 7,978,926 B2 | |
| APPLICATION NO. | : 13/012748 | |
| DATED | : July 12, 2011 | |
| INVENTOR(S) | : Fairbanks et al. | |

It is certified that error appears in the above-identified patent and that said Letters Patent is hereby corrected as shown below:

In Column 9, Line 59, please delete "Harming" and insert --Hanning-- therefor.

In Column 9, Line 67, please delete "Harming" and insert --Hanning-- therefor.

In Column 10, Line 1, please delete "Harming" and insert --Hanning-- therefor.

Signed and Sealed this
Tenth Day of January, 2012

David J. Kappos
*Director of the United States Patent and Trademark Office*